United States Patent [19]
Barnett et al.

[11] 3,854,838
[45] Dec. 17, 1974

[54] POLE CORER

[75] Inventors: George J. Barnett, La Prairie, Quebec; Mark Stanoy, Montreal, Quebec; Robert L. Watson, St. Leonard, Quebec, all of Canada

[73] Assignee: Domtar Limited, Montreal, Canada

[22] Filed: Dec. 5, 1972

[21] Appl. No.: 312,364

[52] U.S. Cl. ............................. 408/59, 408/705
[51] Int. Cl. ............................................ B23b 41/02
[58] Field of Search ........... 408/59, 705, 56, 57, 60, 408/204, 206

[56] References Cited
UNITED STATES PATENTS

| | | | |
|---|---|---|---|
| 18,370 | 10/1857 | Stevens | 408/59 |
| 772,043 | 10/1904 | Kleinschmidt | 408/59 |
| 3,163,190 | 12/1964 | Ervin | 408/57 X |
| 3,502,124 | 3/1970 | Mater | 408/59 X |
| 3,559,513 | 2/1971 | Hougen | 408/204 |

FOREIGN PATENTS OR APPLICATIONS

| | | | |
|---|---|---|---|
| 1,944 | 7/1871 | Great Britain | 408/57 |

Primary Examiner—Andrew R. Juhasz
Assistant Examiner—F. R. Bilinsky
Attorney, Agent, or Firm—Cecil A. Rowley

[57] ABSTRACT

A method and apparatus for the coring of poles comprising a tubular drill casing having a cutting bit at one end. The drill casing is rotated and the pole and casing are moved axially relative to one another to core the pole. During the coring operation, compressed air is directed into the drill casing to eject chips cut by the drill. The rotation and relative axial movement of the drill casing and pole are correlated to control the size of the chip so that the chips are carried out between the outer periphery of the drill casing and the outer periphery of the cored hole. A special drill bit for the coring operation is also disclosed.

6 Claims, 8 Drawing Figures

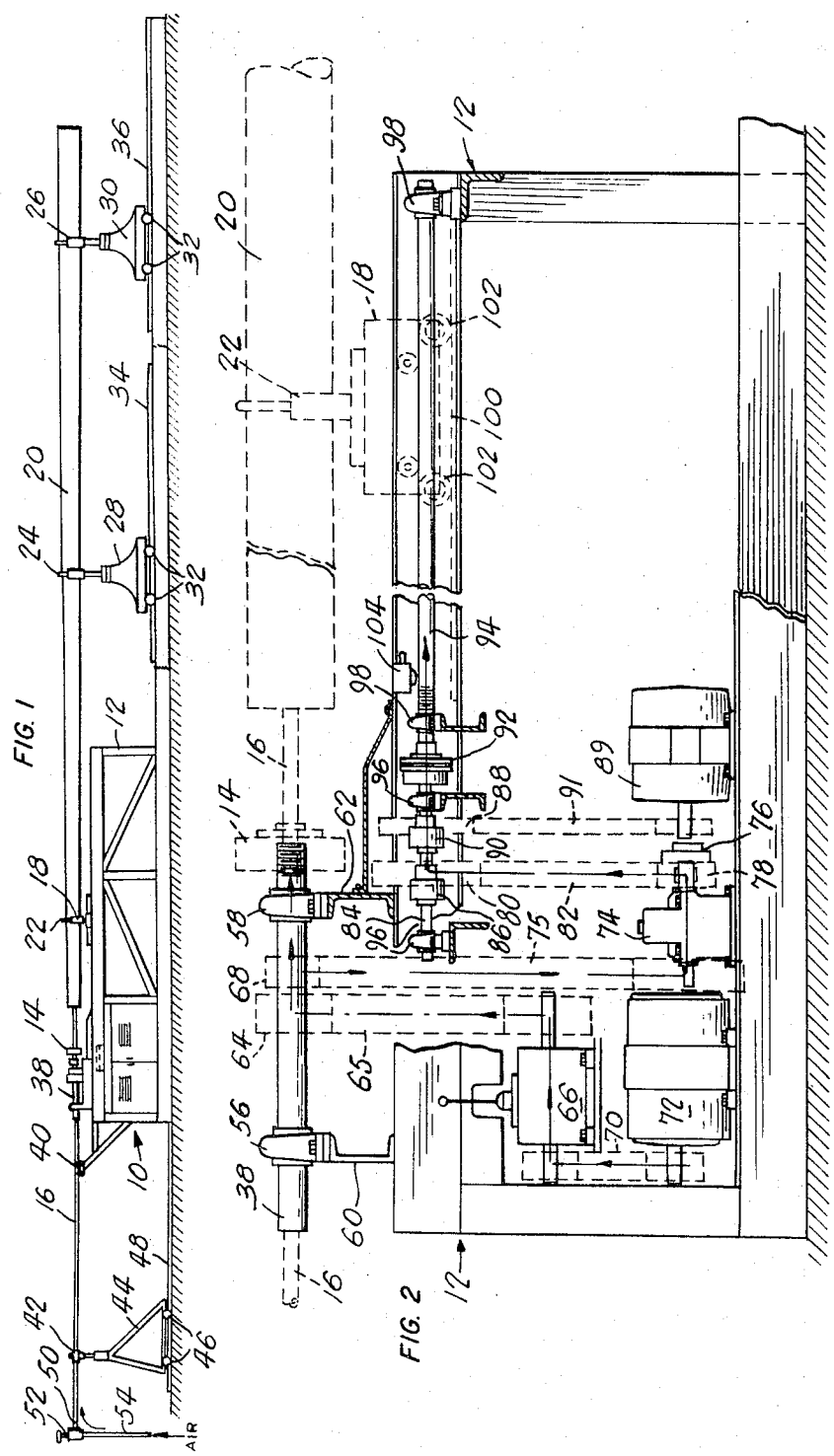

PATENTED DEC 17 1974

POLE CORER

FIELD OF INVENTION

The present invention relates to a method and apparatus for coring of poles, more specifically the present invention relates to a method and apparatus for coring hydro poles.

DESCRIPTION OF PRIOR ART

Hydro poles are currently being used to support light standards or davits, and under such conditions are subjected to high torsional stresses due to the cantilever mounting of the lamp fixture and the action of the wind which tends to rotate the fixture about the pole. Conventionally, the wiring for these lamp fixtures extend from the base of the pole up to their connection to the lamp along an axial groove cut in from the outer periphery of the pole. This groove is filled and sealed with an insert to protect the wiring. It will be recognized that the use of such a longitudinally extending groove severely reduces the torsional strength of the pole thereby requiring that the pole size be increased beyond what would normally be required under the torsional stresses. This increase in pole size obviously increases the cost of the poles and it has, therefore, been the aim of the manufacturer to overcome this disadvantage of the axially extending groove.

Attempts have heretofore been made to axially drill a pole along its centre line, however, it is believed that these prior attempts have been unsuccessful. It is believed that the drilling techniques employed resulted in the failures. The length of drill necessary, the force of gravity thereon, together with the non-uniformity of the pole generated extreme difficulties preventing accurate drilling and resulting in the drill, in many cases, coming out through the side of the pole. Much research has been directed to improve the accuracy of axial drilling, but until the instant invention very little success has been achieved.

It is thus the object of the present invention to provide a method and apparatus for providing a substantially axially extending hole along the length of a pole.

SUMMARY OF INVENTION

Broadly, the present invention relates to a method of coring a pole comprising cutting an annular longitudinally extending hole in said pole by means of a tubular drill casing, supporting said drill casing on a core defined by said annular cut, correlating the relative movement between said pole and said tubular drill rod in accordance with a set of the teeth on said drill casing thereby to provide a cutting action to produce chips of a size to pass between said drill casing and the outer diameter of said annular hole, injecting air under pressure into said tubular drill casing and through the space between the outer diameter of said tubular drill casing and the outer diameter of said annular hole to deliver chips formed by said cutting operation out of said hole.

The present invention also broadly relates to an apparatus for substantially axially coring poles comprising, a tubular drill casing having a plurality of cutting teeth in the form of an annular ring at one end thereof, spaces between said teeth adapted to receive chips cut by said teeth, means for rotating said drill casing, means for relatively axially moving said drill casing and a pole to be drilled, means to correlate the rotation of said drill casing with said relative axial movement between said drill casing and said pole to cut an annular hole in said pole while producing chips of a required size, and means to introduce air under pressure into said tubular drill casing, said spaces between said teeth being of sufficient size to receive a plurality of said chips and permit same to be contacted by said air and delivered out of said annular hole in the space between the outer periphery of said drill casing and the outer periphery of said annular hole.

The present invention further broadly relates to a drill bit for coring composed of a tubular member having a set of teeth at one end thereof, said teeth being arranged about said member, each of said teeth having a leading face in a substantially axial plane, with cutting edges of said teeth arranged in a common radial plane. Spaces between the teeth are sufficiently large to accommodate a plurality of chips cut by said teeth.

BRIEF DESCRIPTION OF THE DRAWINGS

Further features, objects and advantages will be evident from the following detailed description of a preferred embodiment of the present invention when taken in conjunction with the accompanying drawings in which:

FIG. 1 is a schematic side elevation illustrating one form of the present invention, FIG. 2 is a side elevation illustrating the arrangement of the drive for the drill casing and to obtain the relative movement between the drill casing and the pole.

Figure 3:
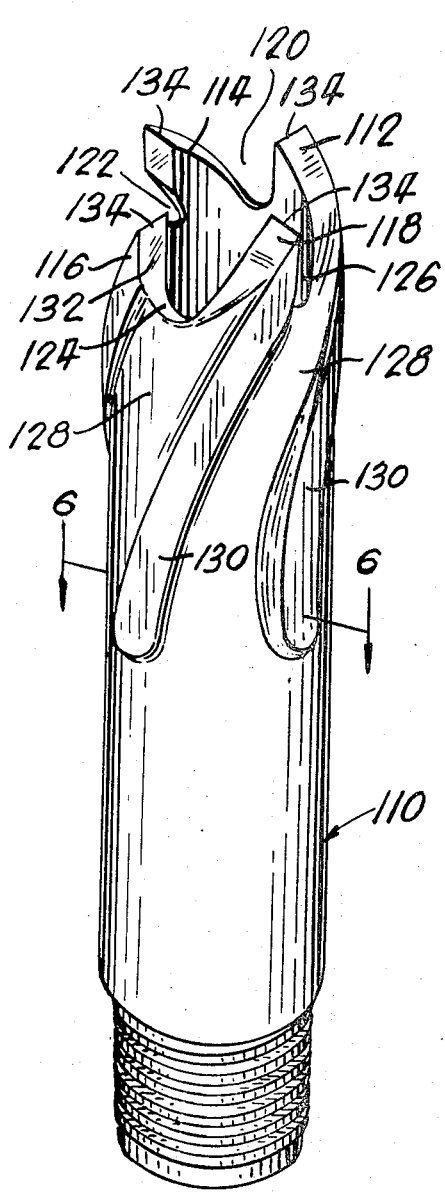
FIG. 3 is an isometric view of one form of bit found satisfactory for carrying out the present invention.
Figure 4:
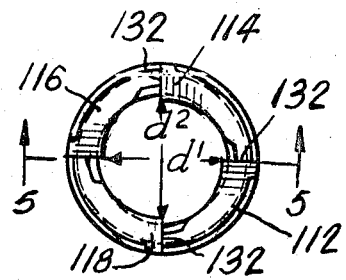
FIG. 4 is a plan view of the bit of FIG. 3.
Figure 5:
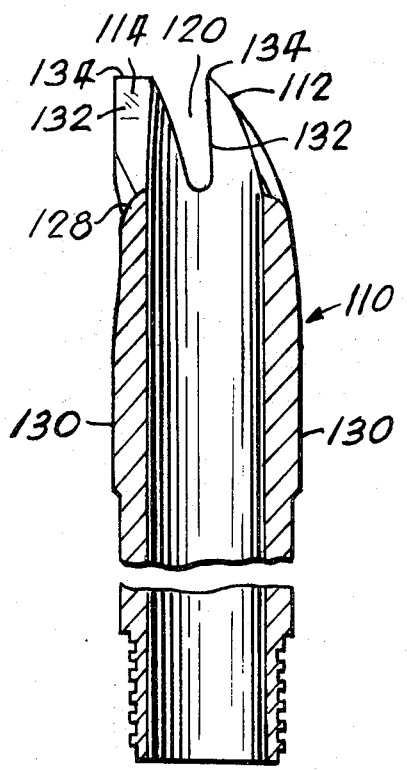
FIG. 5 is a section along the line 5—5 of FIG. 4.
Figure 6:
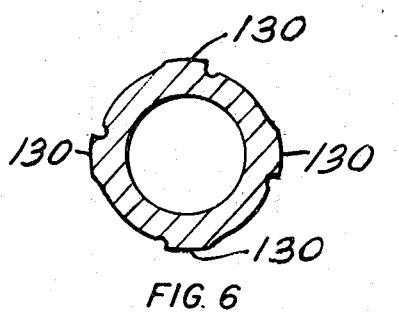
FIG. 6 is a section along the line 6—6 of FIG. 3.

The basic coring machine 10 has a main supporting frame 12 which houses the drive for a chuck 14 that drives a drill casing 16. This frame 12 also movably supports the carriage 18 for movement synchronized with the rotation of the chuck 14 during an advancing stroke of the carriage 18 as will be described hereinbelow.

The pole 20 to be cored is supported by a clamping mechanism 22 on the carriage 18, and by clamping mechanisms 24 and 26 which are supported by movable carriages 28 and 30 respectively. Each of the carriages 28 and 30 are provided with rollers 32 which guide the movement of the carriages 28 and 30 along the tracks 34 and 36 respectively.

The gripping members 22, 24 and 26 are adjustably mounted on their carriages 18, 28 and 30 to permit centering of the pole 20 with respect to the drill rod 16.

The casing 16 extends rearwardly from the chuck 14 through a hollow tubular member 38 (see FIGS. 1 and 2), and is supported at the rear of the machine by an outrigger bearing 40 and a further bearing 42. The bearing 42 is mounted on trolley 44 which, by means of rollers 46, moves along track 48 when the rod 16 is moved to the right in FIG. 1. The movement of the trolley 44 which, by means of rollers 46, moves along track 48 when the rod 16 is moved to the right in FIG. 1. The movement of the trolley 44 with the drill rod 16 is obtained by means of a flange, such as flange 50, at the end of the drill rod engaging with the bearing 42. It can be seen that in the position illustrated, the collar 50 would not engage the bearing 42 until the rod 16 had first advanced a predetermined amount.

A coupling 52 is connected to the free end of the drill casing 16 in a manner to permit relative rotational movement between the drill casing 16 and coupling 52. This coupling is connected to a source of air under pressure by means of the tube 54 whereby air under pressure may be introduced to the interior of the hollow drill casing 16.

Referring to FIG. 2, the mounting of the chuck 14 on the frame 10 is more clearly illustrated. As shown, the chuck 14 is connected to rotate with the hollow tube 38 which in turn is mounted in bearings 56 and 58 which are supported by beams 60 and 62 forming part of the main frame 12.

Tubular member 38 is provided with a driven pulley 64 and a drive pulley 68 which form part of the driving mechanism of the machine 10. The driven pulley 64 is driven via belt 65, speed reducer 66, and belt 70 from the main motor 72 thereby to rotate the tubular member 38 and thus the pulley 68 and the chuck 14 together with the drill casing 16. The drive pulley 68 in turn drives shaft 84 via belt 75, speed reducer 74, control clutch 76, which may be manually operable, pulley 78, belt 82, pulley 80 and one-way clutch schematically illustrated at 86.

The one-way clutch mechanism 86 permits the pulley 80 to drive the shaft 84 only in the direction that tends to advance the carriage 18, as will be described in more detail hereinbelow. Also mounted on the shaft 84 is a second driven pulley 88 which is drivably connected to the shaft 84 through a one-way clutch mechanism schematically illustrated at 90. The clutch is adapted to drive shaft 84 in the opposite direction of rotation to that imparted thereto by the pulley 80. Both the one-way clutches 86 and 90 permit free-wheeling of their respective pulleys 80 and 88 on the shaft 84 when the shaft is driven in the opposite direction.

The pulley 88 is driven by the motor 89 through belt 91. Precautions will be taken in the wiring of the two motors 72 and 89 to ensure that both motors are not actuated simultaneously.

The shaft 84 is connected via clutch 92 with the main drive shaft 94 for movement of the carriage 18 and thus the pole 20. This clutch 92 is adjusted to limit the total torque applied to the main drive shaft to ensure the shaft 94 is not damaged.

In the illustrated arrangement the shafts 84 and 94 are axially aligned and are mounted in bearings 96 and 98 respectively on the frame 12. However, these shafts need not be aligned and may be positioned in any convenient location on the frame 12.

In the arrangement illustrated, the main drive shaft 94 is provided with a screw thread which engages a suitable nut or the like (not shown) on the carriage 18 so that rotation of the screw in either direction moves the carriage 18 relative to the frame 12 to move the pole 20 toward and away from the chuck 14. The carriage 18 is supported by rollers 102 for movement along suitable tracks 100 on the frame 12. And a limit switch 104 senses the position of the carriage 18 and by suitable switching and timing circuits (not shown) controls the operation of the motors 72 and 89.

The mechanisms described hereinabove may be replaced with other equivalent mechanisms to drive the hollow drill rod 16 and the pole 20. For example, the advance of the pole 20 may be obtained by hydraulic means or by a pulley and cable combination provided that the relative movement between the drill rod 16 and the pole 20 is coordinated with the rotary movement of the drill rod 16 to produce the required size of chip as will be described in more detail hereinbelow. Also, it is preferred to have a quick return mechanism for the pole when the drill rod 16 is being advanced.

In the embodiment illustrated, the pole is advanced, retracted to pull out a further length of drill rod and advanced again, thereby to stepwise extend the drill rod and drill through the total length of the pole 20. It is also possible to have the full length of the drill rod 16 project in front of the chuck 14 and to continuously advance the pole 20 onto the drill rod. However, in this particular arrangement suitable retractable bearing means would have to be provided to support the extending length of the drill rod 16. These bearings may be retracted in any suitable manner for example automatically by the axial advance of the pole 20 onto the drill casing 16 or manually. The arrangement wherein the pole is continuously advanced permits the drive to be simplified and is probably the most economical system to build from a capital cost point of view.

It is also possible to simply fix the pole 20 and to axially advance the rotating drill casing 16, for example, by moving the tubular member 38 relative to the frame 12 and providing a splined connection between the driven and drive pulleys 64 and 68 and the tubular member 38. In operation, the tubular member 38 would be retracted, the chuck 14 tightened on the drill casing 16, and the tube and chuck rotated and advanced to drill the pole 20, and at the end of the advancing stroke the chuck 14 would be released and the tubular member 38 and chuck 14 retracted and the procedure repeated.

In yet another alternative system, the drill casing 16 could be continuously advanced by a suitable driving mechanism advancing and rotating the drill rod 16 directly. Again, the timing of the advance of the drill rod relative to its rotational movement will be coordinated to ensure that the chip size produced by the cutting teeth, to be described hereinbelow, can be removed from the drilled hole.

A drill bit for cutting the annular hole in the pole is shown in FIGS. 3 to 6. The illustrated bit 110 is provided with four teeth 112, 114, 116 and 118, separated by recesses 120, 122, 124 and 126 respectively and symmetrically positioned about the center of the bit 110.

One satisfactory bit is made from tubing having an o.d. of 1 ¼ inches and an i.d. of fifteen-sixteenths inch, the teeth 112, 114, 116 and 118 being provided with a set of three sixty-fourths inch greater than the o.d. of the tubing and one thirty-second inch less than the i.d. of the tubing, to provide the required clearance for the tubing and permit chips cut by the teeth to pass upwardly in the clearance space between the o.d. of the tubing and drill rod and the o.d. of the drilled hole.

To ensure that the chips are carried from the cutting section out along the outer periphery of the drill casing 16, it is necessary that the recesses 120, 122, 124, and 126 be relatively large and to control the size of the chip formed. The large recesses permit the cut chips to be picked up by the pressurized air and carried out of the drilled hole. As can be seen, the bottoms of the recesses 120, 122, 124 and 126 flare outwardly and rearwardly toward the outside diameter of the casing as indicated by the surface 128 in FIGS. 3 and 5. It has been found that if the size of the openings 120, 122, 124 and 126 are not properly correlated with the size and the number of chips produced, the drill will become plugged and coring substantially impossible. Similarly, the size of chips must be small enough to pass between the outer diameter of the casing and the hole.

The illustrated bit is also provided with guiding surfaces 130 which take the form of elevated ridges projecting from the surface of the drill casing in the clearance provided by the set of the teeth. Each guiding surface extends in a helical pattern from the tip of the tooth rearward along the casing there being one such guiding surface 130 for each of the teeth. The length of these guiding or centering surfaces 130 is not critical, however, it is preferred to have at least about 1 ½ inches axial length to aid in guiding the bit. Similarly, the width of the surfaces 130 is not critical, however, the surface should be sufficiently wide to provide adequate bearing area but not so wide as to materially obstruct the flow of chips or powdered wood between the inside diameter of the hole being cut and the outside diameter of the drill casing (see FIGS. 3, 5 and 6).

Each of the teeth 112, 114, 116 and 118 is preferably provided with a front or leading face 132 extending in a substantially axial plane and with the cutting edges 134 of each of the teeth being located in the same radial plane. It is also preferred to have the inside diameter of one pair of opposed teeth, say teeth 112 and 116, slightly less than the inside diameter of the other pair of opposed teeth, i.e., $d_1$ would be slightly less than $d_2$ (see FIG. 4). These particular arrangements and configurations of the teeth are not absolutely essential to the operation but have been found to improve operation.

Figure 7:
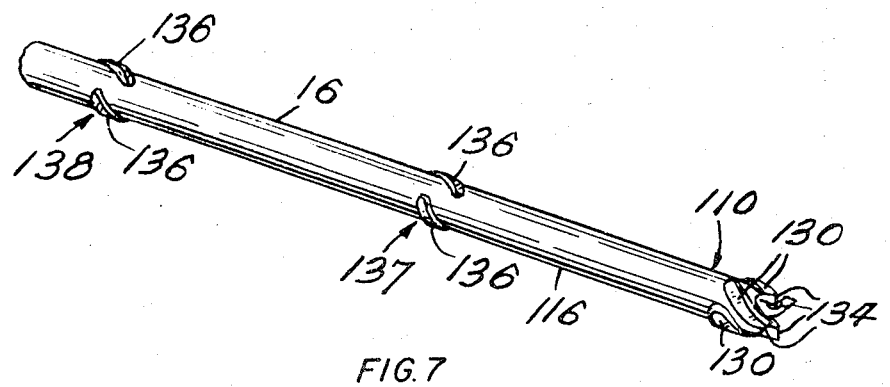
FIG. 7 is a partial isometric view of the drill casing incorporating guiding surfaces.

In some cases, it is desirable to have further guiding surfaces 136 which are in the form of discrete spiral lengths projecting across the clearance between the outer periphery of drill casing 16 and the hole being cut. These guiding surfaces 136 will be essentially the same as the guiding surfaces 130 described hereinabove. The number of such surfaces and their area are determined by the bearing suport desired provided it does not interfere materially with the passage of chips cut and travelling out of the drill hole. The axial spacing of the various groups 137 and 138 shown in FIG. 7 is not critical, however, it has been found that certain spacings do operate better than others and it is preferred to maintain a spacing of approximately 5 feet between adjacent of said groups.

The operation of the illlustrated arrangement is as follows: a pole 20 is mounted on the carriages 18, 28 and 30 with its axial center line substantially aligned with the axial center line of the drill casing 16. A length of drill casing 16 with a drill bit 110 on its free end is projected from the side of the chuck 14 facing the narrower end of the pole 20. The chuck 14 is tightened to hold the drill casing 16 fixed relative to the tubular member 38 and the motor 72 is energized. The motor 72 through belt 70, speed reducer 66, belt 65 and pulley 64 rotates the tubular member 38 and thereby the chuck 14 and drill casing 16. Rotation of the tubular member 38 causes rotation of the pulley 68 which drives pulley 80 via belt 75, reducer 74, clutch 76, pulley 78 and belt 82. The pulley 80, through its one-way clutch 86, drives the shaft 84 which, in turn, through clutch 92, drives drive shaft 94. This rotation of the drive shaft 94, through its engagement with the carriage 18, causes the carriage 18 to move toward the chuck 14 and thereby move the pole 20 axially onto the drill casing 16. During this movement, the pole is supported by the carriages 28 and 30 which move along the tracks 34 and 36 respectively.

Figure 8:
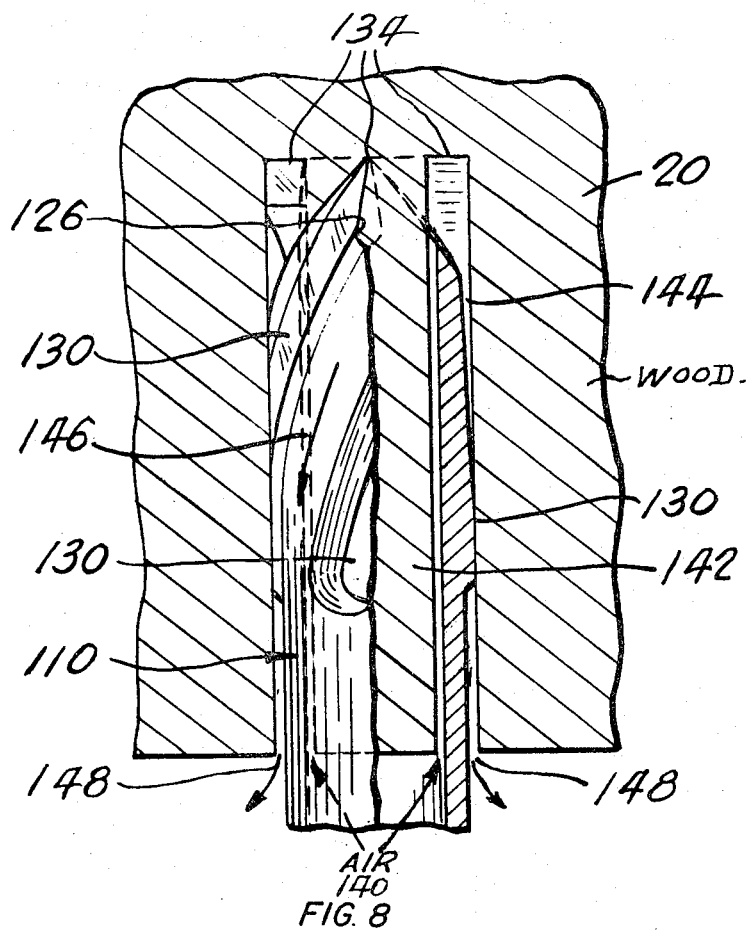
FIG. 8 is a section view through a pole being cut, illustrating the flow of air and the delivery of chips out of the annular passage being cut.

During this cutting operation, air under pressure is supplied to the free end of the drill casing 16 via a connector 52 and pipe 54. This compressed air, as indicated by the arrows 140 in FIG. 8 passes down between the core 142, formed by the annular cut 144, between the outer periphery of the core 142 and the inner periphery of the drill casing 16 and passes to the opposite side of drill casing 16 through the spaces 120, 122, 124 and 126 in the drill bit 110 as shown by the arrow 146. As the air passes through these spaces 120, 122, 124 and 126, it carries with it chips formed by the teeth 112, 114, 116 and 118 and delivers these chips out between the outer diameter of the casing 16 and the outer diameter of the hole 144, as indicated by the arrows 148 (see FIG. 8).

The r.p.m. of the drill casing 16 and the axial advance of the pole 20, as above indicated, are coordinated through their common drive to ensure that the chips cut can be carried from the drill hole 144. Thus, each chip must have at least one dimension less than the three sixty-fourths inch clearance provided by the external set of the teeth 112, 114, 116 and 118 for the speciic example of one drill given hereinabove.

It is believed that the formation of the axially extending core 142 (see FIG. 8) is of prime importance for maintaining the drill bit 110 and thus the drill casings 16 travelling substantially axially of the pole 20. It is believed that this core 142 supports the drill casing 16 through the intermediary of the air cushion provided between the inner diameter of the drill casing and the outer diameter of the core. The air cushion between the outer diameter of the drill casing and outer diameter of the hole 144 also helps to support the drill casing 16. As above indicated, it is also very important to coordinate the rate of rotation of the drill casing 16 with the axial advance of the pole 20 to ensure that the chips can be ejected from the hole 144 through the space between the outer diameter of the drill casing 16 and the outer diameter of the hole 144. The size of the spaces 120, 122, 124 and 126 must be sufficient to accommodate the chips cut and permit same to be engaged and carried away in the air stream.

After the pole 20 has been advanced the full stroke, the limit switch 104 is energized. This shuts off the motor 72 and provides a time delay before the motor 89 is actuated. During this time delay the chuck 14 is loosened so that the drill casing 16 passes freely therethrough. Next, the motor 89 is actuated which through belt 91, pulley 88, and one-way clutch 90, rotates the drive shaft 94 in the opposite direction to the rotation imparted thereto by one-way clutch 86 to move the carriage 18 and thus the pole 20 and carriages 28 and 30 rearwardly relative to the chuck 14, i.e., to the right in FIGS. 1 and 2, at a faster rate than the rate of advance of the pole 20 toward the chuck 14. The drill casing 16 normally will be drawn with the pole 20 so that a further length thereof extends in front (to the right in FIG. 1) of the chuck 14. If the drill casing 16 is not advanced with the pole 20 it may be necessary to simply push same back into the hole 144 previously cut in the pole 20. The chuck 14 is then again tightened and the operation repeated by stopping of the motor 89 and starting of the motor 72.

The motor 89 is provided so that the rate of retraction of the pole 20 is not dependent on its rate of advance. Thus, when the motor 89 is actuated, the drive shaft 94 rotates much faster when it is rotated by the drive connected to the motor 72 so that the pole 20 is retracted relatively more quickly.

If the other systems, described hereinabove and wherein the drill casing 16 is moved, are used the operation is substantially the same except that the pole 20 remains stationary and the chuck 14 is reciprocated, or if more sophisticated drive means are used, the drill casing 16 can be driven directly so that continuous rotation and axial advance is obtained.

In the embodiment described wherein the full length of the casing 16 projects in front of (to the right of) chuck 14, the pole 20 will be continuously advanced by a device such as carriage 18 and drive shaft 94, however, loosening of the clutch 142 and advancing of the casing 16 will be unnecessary. The advance of the pole 20 onto the projecting drill casing may automatically retract the bearings supporting the casing.

It is important that the drill bits be maintained relatively sharp, and preferably that they have a relatively high r.p.m. rate relative to the rate of relative movement between the drill bit and the pole to reduce the chances of the bit being deflected by contact with a knot or the like in the pole 20. It has been found that an r.p.m. of 400 for a rate of relative axial movement between the rod and pole of 2½ f.p.m. is satisfactory with the specific drill bit shown in FIG. 3. Under these circumstances, an air pressure of 100 p.s.i. proved to be more than adequate.

Having described various embodiments of the present invention, modifications will be evident to those skilled in the art without departing from the spirit of the invention as defined in the appended claims.

We claim:

1. An apparatus for substantially axially coring poles comprising a tubular drill casing extending along a longitudinal axis and having a cutting end provided with a plurality of cutting teeth arranged in an annular ring lying in a plane transverse to said axis, said cutting teeth having an inside and an outside set, spaces between said teeth, means for rotating said drill casing, means for relatively axially moving said casing and said pole to be drilled, means to correlate the rotation of said drill with the relative axial movement between said drill and said pole thereby to form in said pole a core surrounded by an annular hole while producing wood particles having at least one dimension less than a preset length, means for introducing air under pressure into said tubular casing and forcing said air to pass between said core and the inside of said casing through said spaces between said teeth and back between the outside of said casing and the surface of said annular hole, said spaces between said teeth being of sufficient size to receive a plurality of said wood particles and permit same to be contacted by said air and delivered out of said annular hole in the clearance space formed by said outside set between the outer periphery of said casing and the outer periphery of said annular hole, guiding surfaces projecting radially from said casing a distance substantially equal to said outside set and extending substantially helically around said casing, some of said guiding surfaces trailing in a spiral path one from each of said teeth and further of said guiding surfaces positioned at spaced locations along said casing.

2. An apparatus as defined in claim 1 wherein said teeth are arranged in opposed pairs.

3. An apparatus as defined in claim 2 wherein said opposed pairs of teeth have different internal sets 4. An apparatus as defined in claim 3 wherein there are four of said teeth.

5. An apparatus as defined in claim 1 wherein said teeth have their cutting edges in a common plane perpendicular to said longitudinal axis.

6. An apparatus as defined in claim 5 wherein the leading surface of each of said teeth is in a plane substantially parallel to said longitudinal axis.

* * * * *